Sept. 7, 1965    D. L. REHNSTRÖM ETAL    3,204,983
ARRANGEMENT FOR HOLDING DURING TRANSPORT ON A VEHICLE A NUMBER
OF ELONGATED HEAVY SUBJECTS, ESPECIALLY LOGS
Filed Dec. 17, 1963    4 Sheets-Sheet 1

United States Patent Office 3,204,983
Patented Sept. 7, 1965

3,204,983
ARRANGEMENT FOR HOLDING DURING TRANSPORT ON A VEHICLE A NUMBER OF ELONGATED HEAVY SUBJECTS, ESPECIALLY LOGS
Dick Lennart Rehnström and Erland Karl Georg Marklund, Skelleftea, Sweden, assignors to Fabriks AB Forslund & Co., Skelleftea, Sweden
Filed Dec. 17, 1963, Ser. No. 331,205
Claims priority, application Sweden, Dec. 20, 1962, 13,770/62
11 Claims. (Cl. 280—179)

The present invention relates to an arrangement for holding a number of elongated, heavy subjects to be transported by means of a vehicle. Particularly, although not exclusively, the invention relates to equipment to be mounted on such vehicles as tractors or the like for transporting trees and logs. The type of arrangement concerned comprises a sturdy frame serving as a support for the subjects in question, hereinafter referred to as the load, at least one arm which is swingable in relation to said frame and adapted to hold the load, and mechanical means for imparting to each arm its swinging movements. In the prior art devices of the kind just defined the load has not been satisfactorily held in position so that, especially at transports in hilly terrain, longitudinal displacement thereof has often occurred.

The principal object of the invention is to provide a device at which the disadvantage above accounted for is effectively eliminated. According to the main characteristic of the invention each arm is swingable between a substantially vertical receiving position and an essentially horizontal holding position and connected to chains or the like which for fixation of the load are adapted to be tightened around it when actuated upon by means displaceable in said transverse direction.

Three embodiments of the invention will now be described in greater detail, reference being made to the accompanying drawing.

FIGURE 1 relates to a first embodiment of the invention and illustrates a perspective view of the mechanical portion of the device as well as a circuit diagram for its hydraulic control portion.

Figure 1:
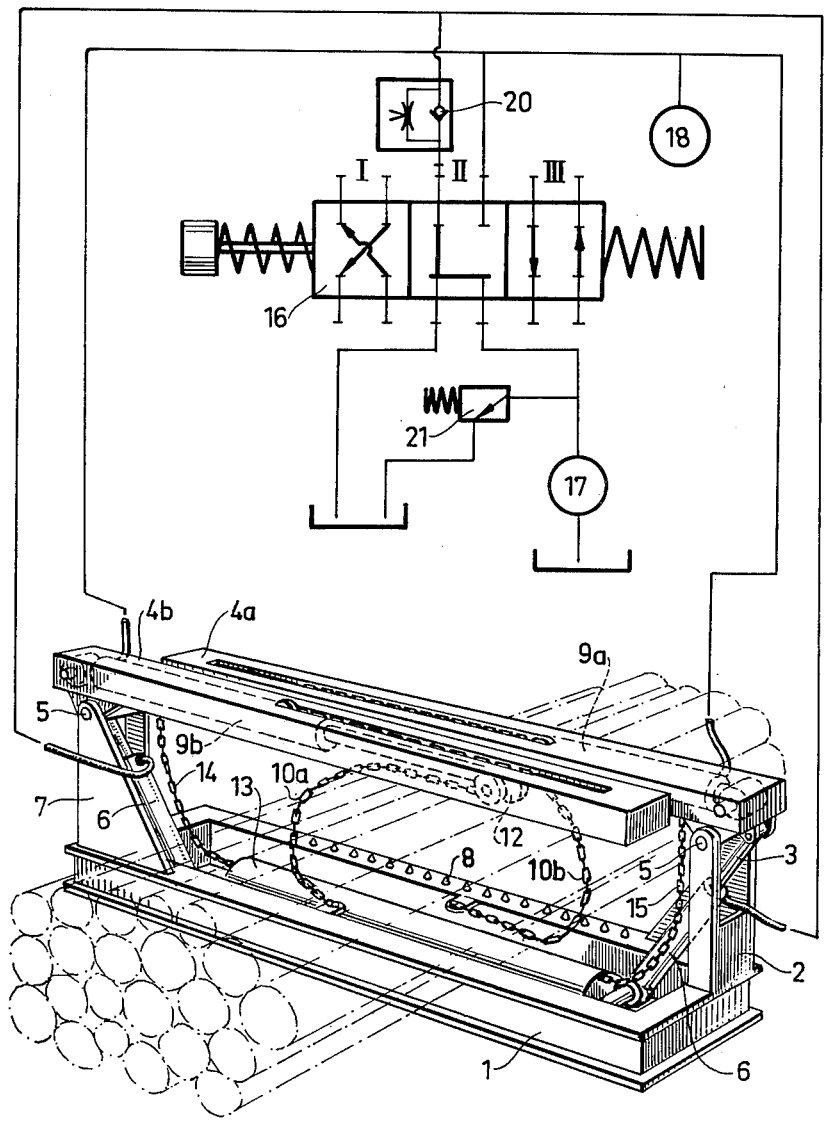
Figure 2:
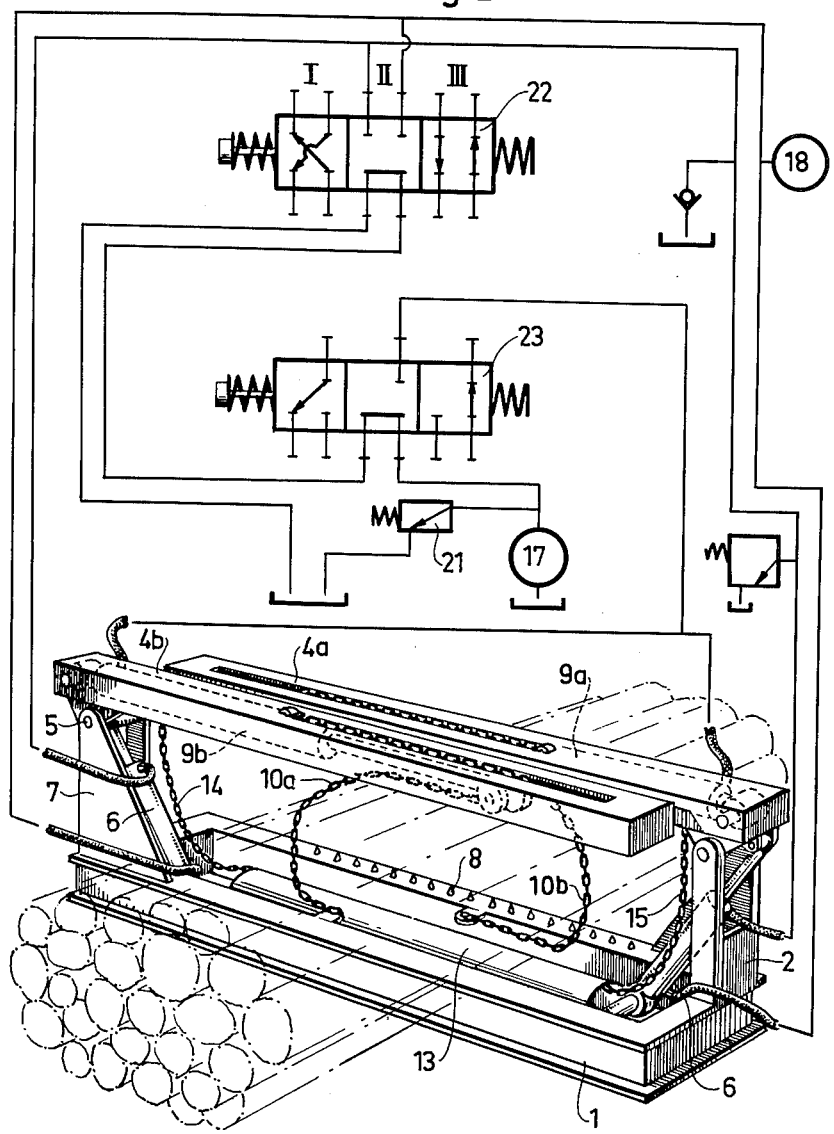
FIGURE 2 is a view similar to that shown in FIGURE 1 but relating to a second embodiment of the invention.

Reference numeral 1 designates a heavy, rectangular frame composed by I-beams and forming a support for the load to be transported. In FIGURES 1 and 2 the load has been shown in dash-dotted lines indicating a plurality of logs. At each lateral end of frame 1 there is a short, sturdy post 2 at the upper end of which an arm 4a and 4b, respectively, is mounted for swinging movements around a horizontal pivot 5. Near said pivot 5 each arm 4 is articulated to the outer end of a piston rod 3 forming part of a hydraulic cylinder and piston device 6. According to the embodiment shown in FIGURE 1 said device 6 is of the single-acting type. The mechanical portion of the arrangement does further comprise a triangular plate 7 mounted near each control cylinder 6 in order to protect it from being damaged by the load. On the upper surface of frame 1 there is a plurality of short, sharp pins 8. They are intended to penetrate into the logs in the lowermost layer of the load and, in that manner, contribute to the load being prevented from sliding along the frame. Each arm 4 is shaped like an elongated box having slotted top and bottom surfaces and enclosing a single-acting hydraulic cylinder 9a and 9b, respectively. As appears most clearly from FIGURE 3, a chain 10a, 10b has its ends attached to the respective one of arms 4 and to the frame 1. Reference numeral 11 designates the point at which each chain 10 is attached to its related arm 4. The upper portion of the chain passes round a pulley 12 mounted for rotation at the end of the piston rod projecting from the hydraulic cylinder 9. Within the space defined by frame 1 there is loosely mounted a heavy bar 13. Attached to bar 13 are the lower ends of two short chains 14 and 15, the upper ends of which are connected to their respective arms 4a, 4b at a comparatively short distance inside their pivots 5.

The hydraulic portion of the arrangement shown in FIGURE 1 does, in addition to oil containers, tubing and the like, comprise on the one hand a control valve 16 having three different control positions I, II and III, an oil pump 17 and a pressure accumulator 18. Further, there is a regulating valve 20 for variation of the angular speed of arms 4a and 4b during their swinging movements, and an overpressure valve 21.

Figure 3:
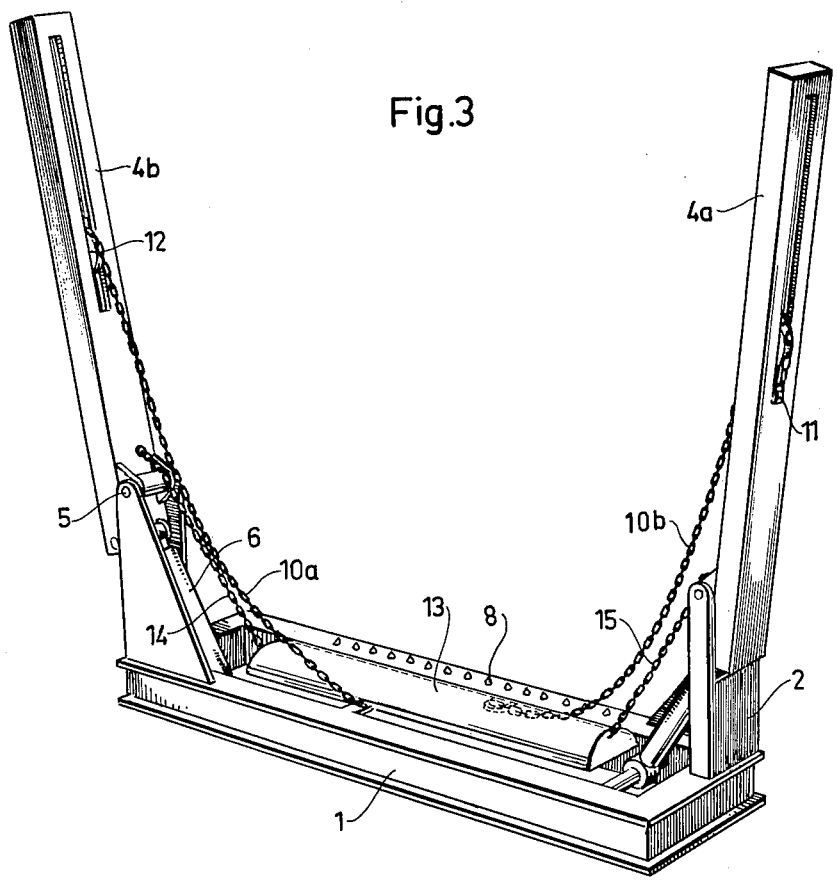
FIGURE 3 shows the mechanical portion of the device, the arms being in their raised positions. This figure is compatible with FIGURE 1 as well as FIGURE 2.

The operation of the arrangement shown in FIGURE 1 and above described is as follows. Control valve 16, which normally is in its neutral position II, is first brought into position I whereby pressurized oil is supplied to the hydraulic cylinders 6, so that they cause arms 4 to assume their raised or opened positions as shown in FIGURE 3. The load, which is assumed to be constituted by trees or logs, is thereinafter by means of any suitable loading implement placed in the position indicated in FIGURE 1. Generally, the remote ends of the logs are, during transport, not supported by the vehicle on which the arrangement is mounted but do instead slide freely along the ground surface.

Control valve 16 is then set in position III, whereby cylinders 9 are pressurized so that their piston rods are urged outwardly. On account of the fact that arms 4 are still in their raised positions as shown in FIGURE 3, said movement of the piston rods would principally tend, with the aid of chains 10, to raise the load from the frame. However, this does not occur due to the fact that arms 4 are not locked in their positions for which reason the net result instead is that they are swung inwardly over the load. During the continued outward movement of the piston rods the downwardly directed movements of arms 4 go on until either their bottom surfaces contact the load or a position is reached where the torque exerted by chains 10 in respect of pivots 5 equals zero. As appears directly from the drawing, bar 13 is in a raised position in FIGURE 3 and in a lowered position in FIGURE 1. Accordingly, in the position last referred to pins 8 penetrate into the lowermost logs. It should be emphasized here that the arrangement is very flexible as far as the cross-sectional area of the load is concerned thanks to the fact that the system for tightening chains 10 permits variation between a completely filled-out load profile and the retainment of quite a few logs only.

Pressure accumulator 18 has a very important function, namely to equalize the variations in the operation pressure of the hydraulic fluid which would otherwise occur due to movements of the load, especially when the vehicle is passing over rough or bumpy ground. When those movements are in such a direction that they tend to cause an overpressure the latter is absorbed by the accumulator thus protecting the hydraulic cylinder devices. In a corresponding manner accumulator 18 prevents the tension of chains 10 from being reduced due to a lower oil pressure which in turn could arise in consequence of, for example, a reduced cross-sectional area of the load produced by relative movements of the logs.

When the vehicle is to be unloaded control valve 16 is adjusted from its neutral position II to position I where arm cylinders 9 communicate with the drain of the hydraulic system whereas swing cylinders 6 are connected to the pressure side of the system. Accordingly, the various parts of the device will again assume the positions shown in FIGURE 3 where bar 13 keeps the logs out of contact with pins 8. This being done, the simplest way to complete the unloading is to drive the vehicle forwards so that the logs slide off.

Turning now to FIGURE 2, in which like or corresponding details have been given the same reference numerals as in FIGURE 1, it should be observed that the sole substantial difference between the two embodiments is that, according to FIGURE 2, cylinders 6 are double-acting instead of single-acting. This has in turn necessitated the use of two control valves, identified as 22 and 23. When valve 22 is in position III arms 4 will accordingly be lowered by positive control instead of being simply drawn downwardly with the aid of chains 10 as is the case in the simpler embodiment illustrated in FIGURE 1. From a purely mechanical standpoint there are however no differences between the two embodiments and the structural and functional deviations resulting from the just-mentioned modification of the hydraulic system are by anyone skilled in the art discernible directly from the drawing.

Figure 4:
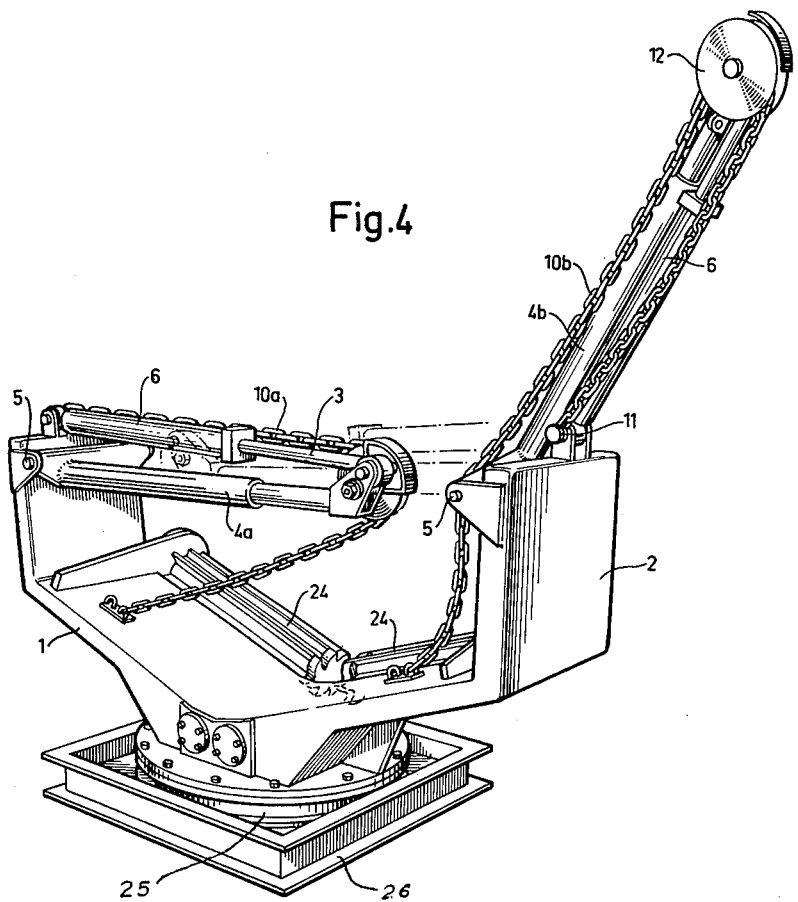
FIGURE 4 shows a perspective view of an arrangement according to a third embodiment of the invention.

In the embodiment shown in FIGURE 4 details 1–6 and 10–12 have direct counterparts in the previous figures. The substantial characteristic of the third embodiment is that each arm 4 is provided with one hydraulic cylinder 6 only. Consequently, that cylinder brings about the swinging movement of the arm round its pivot 5 and also tightens the related chain 10. This has been made feasible by the used of a telescopic arm. Another difference relates to the shape of frame 1. The latter does in this instance comprise two inwardly inclined halves supported by a device 25 for its rotation round a vertical axis. The stationary part of device 25 is secured to a lower square frame 26 which, in turn, is mounted on the chassis of the vehicle. Bar 13 has been replaced by two transversal rollers 24 having on their peripheral surfaces axial splines or ridges extending. They are rotatable round their centre axes for the purpose of facilitating the unloading operation. However, they are normally held in locked positions, suitably by means of hydraulically controlled pawls or the like mounted within frame 1.

What we claim is:

1. A mechanism for holding logs during transport by a vehicle comprising:
   (a) a broad-based, U-shaped frame,
   (b) a pair of arms, each having one end thereof pivoted to the upper ends of the legs of said U-shaped frame and each being of sufficient length to span substantially the entire opening at the top of said U-shaped frame,
   (c) a first pair of hydraulic units pivotally connected to the base of said U-shaped frame and to said one end of each of said arms, and adapted to pivot said arms from a substantially horizontal position to a substantially vertical position,
   (d) a second pair of hydraulic units fixedly attached to each of said arms and running parallel thereto,
   (e) a pair of chains each having one end thereof attached to the free ends of the piston rods of said second pair of hydraulic units and the other ends attached to the base of said U-shaped frame adjacent the center of said frame, said chains being of a length such that actuation of said second hydraulic means causes said chains to pull said arms toward their horizontal position when logs are resting against said chains, and
   (f) an elongated, floating support element suspended from a second pair of chains which are attached to said arms near their pivoted ends, said second chains being of a length such that said floating support is below the top of the base of said U-shaped frame when said arms are in their horizontal position but above the top of the base of said U-shaped frame when said arms are in their vertical position.

2. A mechanism in accordance with claim 1 wherein the first hydraulic units are double acting and additionally pivot the arms from a substantially vertical position to a substantially horizontal position.

3. A mechanism in accordance with claim 1 wherein projecting teeth adapted to penetrate and hold logs are mounted on the top of the base of the U-shaped frame.

4. A mechanism for holding logs during transport by a vehicle comprising:
   (a) a broad-based, U-shaped frame,
   (b) a pair of telescoping arms each having one end thereof pivoted to the upper ends of the legs of said U-shaped frame and each being of sufficient length to span substantially the entire opening at the top of said U-shaped frame,
   (c) a pair of hydraulic units pivotally connected to the upper ends of the legs of said U-shaped frame and having their other ends pivotally connected to the free ends of said telescoping arms,
   (d) a pair of sheave means rotatably attached to the free ends of said arms,
   (e) a pair of chains having one end thereof attached to the tops of the legs of said U-shaped frame then passing over said sheaves, and having their other ends attached to the base of said U-shaped frame,
   (f) a pair of roller elements having longitudinal-disposed ridges mounted parallel to the base of said U-shaped frame and extending partially above the top of the base of said U-shaped frame to engage and permit forward and rearward motion of logs resting thereon, and
   (g) pivot means supporting said U-shaped frame and capable of pivoting on a vertical axis.

5. A mechanism for holding elongated, heavy objects for transport by a vehicle comprising:
   (a) a generally U-shaped frame,
   (b) a pair of arms pivotally attached to the upper ends of the legs of said U-shaped frame and adapted to pivot between a substantially horizontal position and a substantially vertical position,
   (c) means for pivoting said arms attached to said arms to pivot said arms from their horizontal position to their vertical position, and
   (d) a pair of flexible binding means attached to said frame and adapted to be drawn taut about the object to be transported when said arms are lowered from their vertical position.

6. A mechanism in accordance with claim 5 wherein the arms are telescopic and means for pivoting the arms are hydraulic units which both raise the arms and draw the binding means taut about the object being transported.

7. A mechanisim in accordanace with claim 5 wherein the means for pivoting the arms lower the arms from their vertical position to their horizontal position in addition to raising the arms.

8. A mechanism in accordance with claim 5 which additionally includes means for tightening the binding means about the object being transported.

9. A mechanism in accordance with claim 5 wherein the means for pivoting the arms is a pair of hydraulic units.

10. A mechanism in accordance with claim 9 which additionally includes a pressure accumulator connected to the hydraulic units to equalize pressure fluctuations caused by the reactive forces of the loaded objects.

11. A mechanism in accordance with claim 10 which additionally includes a pressure accumulator connected to the hydraulic units to equalize pressure fluctuations caused by reactive forces of the loaded objects.

References Cited by the Examiner

UNITED STATES PATENTS

| | | | |
|---|---|---|---|
| 1,557,195 | 10/25 | Clapp | 280—145 |
| 1,888,973 | 11/32 | Cooper | 105—381 |
| 2,546,511 | 3/51 | Jorgensen | 280—145 |
| 2,754,769 | 7/56 | Yorston | 280—145 X |
| 2,773,700 | 12/56 | Lasswell | 280—179.1 |
| 2,862,756 | 12/58 | Larson | 294—67 X |

FOREIGN PATENTS 647,514  7/37  Germany.

BENJAMIN HERSH, *Primary Examiner.*

A. HARRY LEVY, *Examiner.*